United States Patent [19]
Herbst

[11] 3,863,348
[45] Feb. 4, 1975

[54] STAIR LAYOUT SCALE
[76] Inventor: Herbert H. Herbst, R.D. No. 1, Sunset Dr., Dallastown, Pa. 17313
[22] Filed: Mar. 7, 1973
[21] Appl. No.: 338,750

[52] U.S. Cl. ................................................. 33/111
[51] Int. Cl. ............................................ G01b 3/04
[58] Field of Search ............................. 33/111, 107

[56] References Cited
UNITED STATES PATENTS

| | | | |
|---|---|---|---|
| 1,372,691 | 3/1921 | Herrman | 33/111 |
| 1,608,713 | 11/1926 | Anderson | 33/111 |
| 1,750,370 | 3/1930 | Straus | 33/111 |
| 1,849,128 | 3/1932 | Wood | 33/111 |
| 1,934,096 | 11/1933 | Shimp | 33/92 |

OTHER PUBLICATIONS
Stair Builders Guide by Morris WIlliams, 1923, TH5667W5.

Primary Examiner—Harry N. Haroian
Attorney, Agent, or Firm—C. Hercus Just

[57] ABSTRACT

A stair layout scale adapted to be used relative to the total rise, which is the overall height of the stairs, and the total run, which is the total horizontal dimension of the stairs, whereby the scale may be applied to the space where the stairs are to be installed and, by observing the maximum rise or total run, respectively on two different scales comprising the entire system, two different duplex types of indicia will indicate at a glance on the maximum rise scale the number and heights of the individual risers, and on the tread scale the duplex indicia will indicate the number and width of the treads for the above-indicated number of risers. The individual rise and tread scales comprising the entire system may be provided either on individual, separate tapes or foldable type rules, or upon the opposite surfaces of either a tape or foldable rule.

5 Claims, 5 Drawing Figures

PATENTED FEB 4 1975　　　　　　　　　　　　　　3,863,348

3,863,348

STAIR LAYOUT SCALE

BACKGROUND OF THE INVENTION

Laying out the well known zig-zag outline of stair risers and treads on beams, which are known as support carriages in the building industry, is a very technical procedure and many otherwise capable carpenters are incapable of at least quickly calculating and laying out the outline and dimensions of such stair patterns on said support carriages. One reason for this is that, particularly on an individual installation of a stair, especially where that individual stair will not be repeated otherwise in a dwelling or building, it is necessary to individually calculate the risers and the tread dimensions for each step to be provided in said stair, all of said steps prefably being uniform and equal.

The foregoing calculation normally is undertaken by measuring the overall height or rise of the stair, and after this dimension is determined, the total run of the stair which is the horizontal dimension between the riser of the lowest step and the uppermost riser then is measured. Next, on the basis that an ideal dimension for each riser is between seven and eight inches, although this dimension may vary slightly above or below this range, the number of risers capable of being conveniently accommodated within the total rise dimension then is determined. Knowing that there is always one less tread than the number of risers, the width of the individual treads then is calculated by dividing the number of risers, less one, into the total run dimension. Such calculations nearly always result in fractions of inches or other similar measuring scales and many even reasonably skilled carpenters find these calculations somewhat difficult.

At present, there are available a number of carpenter's squares, which usually are formed from flat sheet steel and have one long member with a shorter perpendicular member extending from one end of the long member, exactly at 90° thereto. Various types of scales are formed upon such squares and usually are pressed into one surface thereof, particularly to facilitate the laying out of two angularly related lines on the support carriage beams after the dimesnions of the risers and treads have been calculated. The difficult procedure is to calculate said dimensions, however, and scales available on such squares are of no assistance in such computation which must be undertaken before the layout can be applied to such support carriage means.

One example of a carpenter's square of the type referred to above is U.S. Pat. No. 1,463,605, to Walters, dated July 31, 1923. Said square primarily is for purposes of calculating roof truss beams and the like but stair-layout squares are available along similar lines.

One additional example of foldable rule having scales thereon for calculating lengths of pipe, for example, to extend between two elbows, for example, disposed at different lateral spacings and different heights comprises the subject matter of U.S. Pat. No. 1608713, to Anderson, dated Nov. 30, 1926. Other types of speciality rules and scales have been divised heretofore but none of these appear to pertain to providing scales which obviate the need to claculate riser and tread dimensions for stairs and provide indicia which can be quickly, visually observed to denote at an instant glance the number of risers and the width thereof required for a given stair layout, followed by equally rapid determination of the preferred width of stair treads to be used with the number of risers determined from the first-mentioned operation. Accordingly, it is the purpose of the present invention to provide a layout scale system by which not only experienced carpenters but even apprentice carpenters readily and quickly can determine the riser and tread dimensions for any given layout of stairs without requiring calculations of any kind. Details of the scale system and the preferred manner of using the same are setforth below.

SUMMARY OF THE INVENTION

It is the primary object of the present invention to provide a scale system which provides preferred riser and stair tread dimensions for a given total rise dimension and total run for a particular stair layout, said scale also denoting the numbers of risers and treads in conjunction with the dimensions thereof.

It is another object of the invention to provide on said scales duplex indicia which readily are distinguishable from each other, either by color or relative disposition of the individual indicium of each duplex indicia, whereby one of said indicium indicates the number of risers or treads, as the case may be, and the other indicium of each duplex indicia indicates the dimension for that particular number of risers or treads.

It is a further object of the invention to arrange the scales embodying the principles of the present invention either on a flexible tape or foldable rule in conjunction with conventional measuring indicia in inches or other comparable systems.

It is still another object of the invention to provide two scales respectively for indicating the number and dimensions of risers and indicating the number and dimensions of treads, said scales being disposed respectively on opposite surfaces of either a flexible tape or foldable rule.

Details of the foregoing objects and of the invention, as well as other objects thereof, are setforth in the following specification and are illustrated in the accompanying drawings comprising apart thereof.

DETAILED DESCRIPTION

Figure 1:
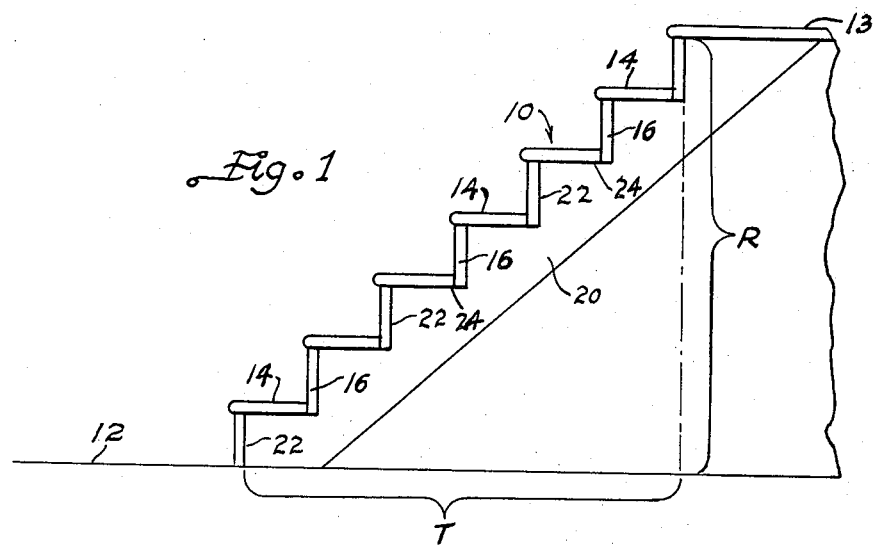
FIG. 1 is an exemplary side elevation of a typical stair layout indicating the total rise dimension and the total run from which the width of treads are calculated.

Referring to FIG. 1, which represents a somewhat diagramatic, exemplary side elevation of a typical stair installation, it will be seen that the total rise of the stair 10 is indicated by the symbol R and represents the distance between a first floor surface 12 and a second floor surface 14. The total horizontal distance to be traversed by said stair is termed the total run of the stair and is indicated by the symbol T in FIG. 1.

The treads 14 and risers 16 of the stair 10 are illustrated in FIG. 1 as comprising, for example, wooden boards which are quite commonly used in forming stairs in dwelling houses as well as buildings of various kinds. It is recognized that the stairs may be formed from materials other than wood. However, the laying out of a stair installation, if not composed of wooden treads and risers and supported, for example, by two or more similar beamlike support carriages 20, requires the same type of computation as now to be described with respect to the exemplary layout of stair installation illustrated in FIG. 1.

Assuming that the exemplary stair of FIG. 1 is formed from wood and includes two or more beamlike support carriage members 20 which are similar, the rudimentary dimensions which are involved in the following claculations comprise the total rise dimension R and the total run dimension T as shown in FIG. 1. It is necessary to compute the width, or height, of the vertical rise lines 22; also the width of the horizontal tread lines 24. It also is necessary to compute the preferred number of risers 16 which also will determine the number of treads 14 to be employed, the width of which also will have to be computed. The scale system embodying the principals of the present invention is used to accomplish such computation.

In computing the dimensions of the vertical risers 22 and horizontal tread dimensions 24, it will be noted that in the installation of conventional stair treads 14 and risers 16, the lower edges of the risers 16 extend downwardly against the rearward edge of the treads 14. This is advantageous to permit the insertion of nails or screws through the lower edges of the risers 14, into the rear edges of the stair treads and thereby brace the same against flexing. Accordingly, the vertical dimensions of the risers 16 will be equal to the vertical rise lines 22, and the treads 14 will be substantially equal to the horizontal tread lines 24 except that, usually, a slight overhang, generally rounded, is provided at the forward edges of the treads 14 for aesthetic purposes. Further, the forward edge portion of each tread 14 overlies the upper edge of the riser 16 which depends therefrom, so that the actual width of the treads 14 is substantially equal to the horizontal tread lines 24.

In computing the layout of the vertical rise lines 22 and horizontal tread lines 24, the first step is to select the number of risers to be used. This is done by bearing in mind that the ideal height of risers is within the range between six inches and eight inches. Also, the total run T of a stair usually is greater than the total rise R. This is for purposes of permitting the use of treads of reasonable width rather than installing what are some times referred to "steep" stairs. Having selected and preferred number of risers 16 to be installed in the stair, by counting the risers and treads of the exemplary layout in FIG. 1, it will be seen that there is one less tread than the number of risers. With the foregoing background in mind, attention is now directed to the scale systems shown respectively in FIGS. 2 and 3 and in FIGS. 4 and 5.

Figure 2:
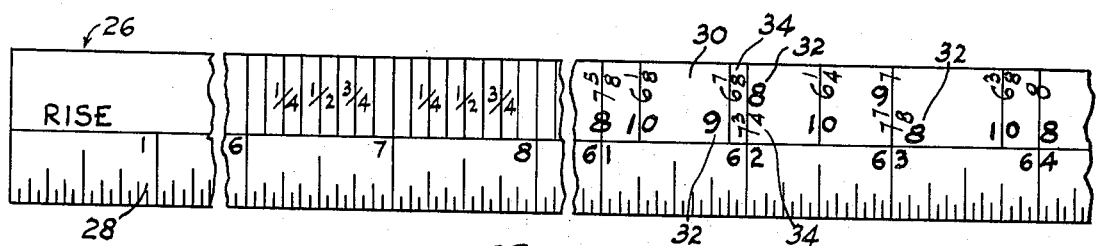
FIG. 2 is a fragmentary, foreshortened exemplary illustration of a scale to claculate numbers and dimensions of risers, said scale being illustrated in conjunction with a conventional scale based upon the English system of inches.
Figure 3:
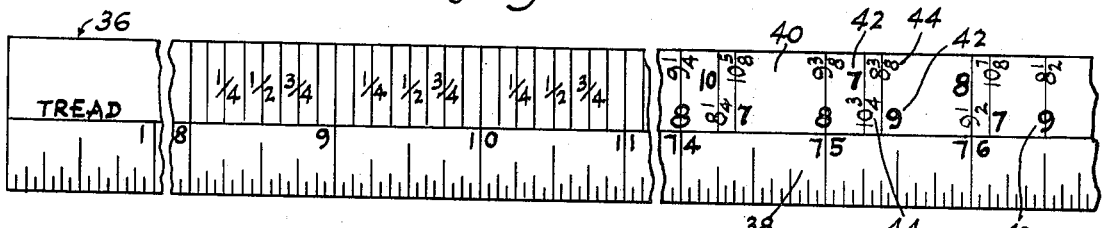
FIG. 3 is a view similar to FIG. 2 but illustrating a special scale employed in accordance with the invention to denote numbers and dimensions of stair treads.

The basic principal of the scales and the indicia representing the same employed in the individual scales shown in FIGS. 2 and 3 comprises multiple transition of whole numbers and fractions in a linear arrangement upon an elongated flexible tape or foldable rule of a common type employed in carpentry. Referring to FIG. 2 for example, it will be seen that either an individual tape 26 or one surface thereof is provided with a conventional scale 28, showing inches and fractions thereof and occupying substantially half of said surface of the tape. The other half 30 comprises a scale embodying the principals of the present invention for determining the numbers and heights of the risers to be employed with respect to a given total rise R as shown in FIG. 1.

To explain in greater detail the indicia employed in the rise scale 30, it will be seen that each of the indicia relative to a transverse line is of a duplex or compound nature. The more prominent, vertical indicia 32 embodied in each duplex indicia represents the number of risers possible to be employed with respect to a given dimension of R. The other indicia 34, for purposes of contrast to the vertical indicia 32, is disposed horizontally as viewed in said figure. This dimension represents the height of a riser corresponding to the number of risers represented by the indicia 32. The arrangement of the respective indicia substantially at right angles to each other is solely for purposes of readily distinguishing between the two. Other means of distinction may be used however, such as by employing different colors for the respective indicia representing the number of risers and the height thereof relative to a given linear dimension which can be determined, if desired, in inches, from the lower scale 28. Another manner of distinguishing between the two indicia would be, for example, to employ Roman numerials for the numbers of risers, or arranging all of the indicia for the numbers of risers in a horizontal row as viewed in FIG. 2, and arranging all of the dimensional indicia representing the height of the risers in a parallel horizontal row adjacent the row of indicia 32 which represents the numbers of risers for a given situation. Still further, the background on the scale with respect to said two separate rows of indicium might be different colors and even other methods of distinction can be employed if desired.

Referring to the left end of the tape shown in FIG. 2, it will be seen that in the region indicating inches less than one foot, only whole and fractional indicia and marking increments are shown in scale 30, especially since it is only on rare occasions that a riser will be less than six or seven inches in height. Also, with respect to the rise scale 30 in the linear area greater than 1 foot for example, all of the individual height dimensions represented by indicia 34 have been accurately calculated with respect to the number of risers, represented by indicia 32, to which that individual dimension pertains relative to the overall linear dimension R. Thus, it will be seen that the arrangement in the tape 26 is a ready means of instantly viewing the area of the tape on which the total rise dimension R falls, and then, especially if there is a close choice between two separate indicia 34, such as in the region of 62 inches, as viewed on the lower scale of FIG. 2, what is considered to be the preferable vertical dimension is selected and the corresponding indicia 32 will immediately indicate the number of risers to be employed.

After determining the number of risers, the tape 36 shown in FIG. 3 then is resorted to. If desired, the several scales 38 and 30 shown thereon may be printed, embossed or otherwise formed on the opposite surface of the tape 26 shown in FIG. 2. The scale 38 is a conventional measuring scale employing inches and fractions thereof, but if desired, a metric system or any other similar type of scale may be used and this same situation holds with respect to the scale 28 on tape 26 shown in FIG. 2. The tread scale 40 embodies the principles of the present invention and represents duplex or compound indicia respectively representing the number of treads and the width thereof for any given number. Hence, the vertical indicia 42 represent the number of treads and the horizontally disposed indicia 44 represent the width thereof for any given number. As indicated above, the tape 36 is utilized in conjunction with tape 26 after the number and height of the risers has been determined. In using the tape 36, it is laid along a floor surface for example, to determine the overall run of the stairs represented by dimension T shown in FIG. 1. This can be read upon the conventional scale 38 of tape 36 but the same is not necessary. All that is necessary to be done is to determine where dimension T falls upon the scale 40. Then, bearing in mind that there is one less tread than riser, the number of risers determined from scale 30 of tape 26 will be reduced by the count of one. Then, that reduced count of treads will be sought on scale 40 nearest the location thereon where the dimension T falls.

As will be seen from the right hand end portion of tape 36 as shown in FIG. 3, a number of the vertical demarcation lines are in close proximity, this is because useful widths of risers preferably should fall within a limited range, such as around 9 or 10 inches. In fact, it has been found that in general, the sum of the riser and tread dimensions should equal approximately 17½ inches. This dimension has been determined somewhat empirically but nevertheless has been found to be practical.

In order to provide a more specific understanding of the present invention, the following example is setforth.

EXAMPLE

Total rise (R) is 62 inches from scale 28, tape 26.

From rise scale 30, there is a choice of nine risers of 6⅞ inches or eight risers of 7¾ inches.

Ideal riser is between 6 and 8 inches Selecting nine risers for solution, for determining width of treads, deduct one riser from total.

Since there is always one less tread than riser, thus eight treads. Total run of stairs of given length T in exemplary installation is 75 inches.

From tread scale 40 consult any eight digit (for number of treads) on the said scale to determine most suitable width.

Scale shows the dimension 9⅜ inches exactly on the digit 8 opposite the 75 inches indicia. Therefore, eight treads each 9⅜ inches wide is ideal.

As indicated above, it is not necessary to employ the conventional scales 28 on tape 26 or scale 38 on tape 36. Hence, referring to FIGS. 4 and 5 which respectively pertain to tread and rise tapes or respectively the opposite sides of a single tape, it will be seen that the rise scale 44 shown in FIG. 5 has a number of duplex or compound indicia thereon of the same general type as shown in rise scale 30 of FIG. 2. In using said scale, it is only necessary to extend the tape or foldable rule upon which the rise scale 45 is printed, embossed or otherwise formed, and note the end of the dimension R as determined from a desired installation. The same procedure as explained above with respect to scale 30 of tape 26 in FIG. 2 then is followed to determine the number and height of risers. Reducing the number by one count after it is determined, tread scale 46 shown in FIG. 4 then is applied to the scale layout and determination of the dimension T is noted upon the scale 46. The nearest compound digit which includes the calculated number obtained from scale 45 will give the width of the tread dimension to be employed in the proposed stair layout. In view of the fact that the duplex indicia employed in the scales 45 and 46 also respectively correspond to scales 30 and 40 in the preceding figures, the same reference numerals have been applied to the respective count and dimension indicia as in FIGS. 2 and 3.

Figure 4:
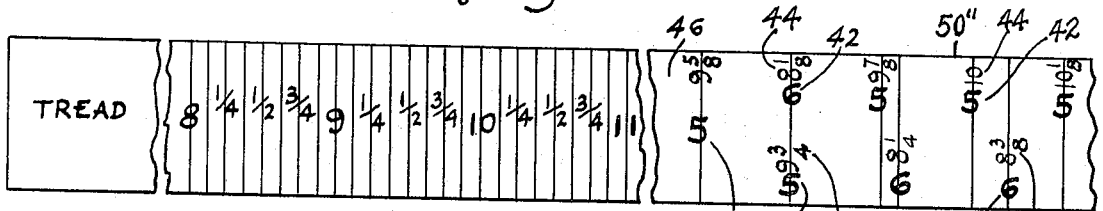
FIG. 4 is a view similar to FIG. 3 but omitting the conventional scale employing the English system of inches, thereby providing greater area for accommodating the special indicium of the duplex indicia of the present invention.
Figure 5:
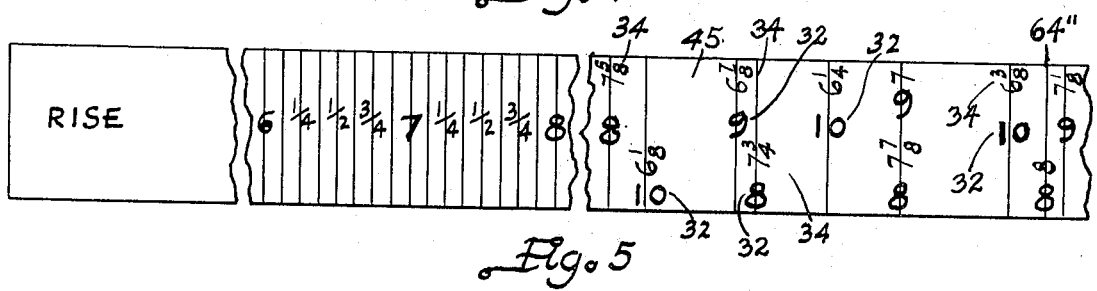
FIG. 5 is a view similar to FIG. 4 but illustrating a scale of the present invention used relative to denoting the numbers and dimensions of stair risers.

For reference purposes to permit employing the scales 45 and 46 shown in FIGS. 5 and 4 respectively, for purposes of calculating an exemplary situation to determine the number and height of risers and corresponding number and width of treads, reference dimensions in inches have been given on said scales adjacent the right hand end. These can be used to calculate for exemplary purposes another given layout of stair from that setforth in the foregoing Example. It also will be seen in the layout of the various scales shown in FIGS. 2–5 that the increments of the rise and tread scales are on a ⅛ inch basis, including various multiples thereof. While it would be possible to calculate similar scales on smaller increments, such as of the order of 1/16 inch, many of the lines would be so close together that it would be almost impossible to imprint indicia which could be convenientely read. Thus, it has been found that the ⅛ inch increment basis is pratical.

It therefore will be seen that the present invention provides a ready means by which either an experienced or novice carpenter can quickly determine a stair layout to arrive at accurate numbers and dimensions of risers and treads which will equal the capability of an experienced, master carpenter if the latter is using conventional, current methods without having scales such as those of the present invention to assist in computations. All that is necessary is to lay the scales along the dimensions for the stair layout to determine the vertical total rise R and the total horizontal run T, note where the dimensions occur on the rise and tread scales, determine the number and vertical dimension of the risers, reduce said number by one count and then observe where that reduced number occurs on the tread scale nearest the dimension T.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. A scale system for laying out rise and tread dimensions on the beamlike support carriage for stairs and comprising an elongated member, a plurality of individual scales thereon respectively indicating the number of risers and treads and the widths of each for given individual total rises and runs for a desired stair installation, said scales each having duplex indicia including a limited range of choices in short increments of dimension respectively indicating by whole number the number of risers and by additional whole numbers and fractions the width of risers and by whole numbers indicating the number of treads and by additional whole numbers and fractions indicating the width of said treads, said duplex whole number and fraction indicia being placed upon said scales at progressive locations corresponding to actual given individual total rises and runs and comprising multiple transitions of the dimensional height of said risers and width of said treads relative to preferred numbers thereof to provide a limited selection possibility best suited for an individual stair installation, of said duplex indicia at said given dimensions having a second set of duplex and indicia indicating a different choice of whole numbers and fractions corresponding to actual given individual total rises and runs.

2. The scale system according to claim 1 in which the whole numbers indicating the number of treads and rises are more visibly prominent that the indicia indicating widths.

3. The scale system according to claim 2 in which the width dimension indicia of said duplex indicia is a different color from the whole indicia thereof.

4. The scale system according to claim 2 in which the width dimension indicia of said duplex indicia is disposed substantially perpendicularly to the whole number indicia thereof.

5. The scale systen according to claim 1 in which said scales are formed respectively along one edge of each of opposite sides of a measuring strip and are supplemented by standard dimension scales of conventional measuring indicia being formed along the remaining edges of said strip.

* * * * *